United States Patent
Partiwala et al.

(10) Patent No.: US 11,264,811 B2
(45) Date of Patent: Mar. 1, 2022

(54) EFFICIENCY BASED BATTERY CONFIGURATIONS

(71) Applicant: HEWLETT-PACKARD DEVELOPMENT COMPANY, L.P., Houston, TX (US)

(72) Inventors: Suketu Partiwala, Houston, TX (US); Monji G. Jabori, Houston, TX (US); Stephen Ken Gustafson, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 717 days.

(21) Appl. No.: 16/077,339

(22) PCT Filed: Apr. 21, 2017

(86) PCT No.: PCT/US2017/028978
§ 371 (c)(1),
(2) Date: Aug. 10, 2018

(87) PCT Pub. No.: WO2018/194684
PCT Pub. Date: Oct. 25, 2018

(65) Prior Publication Data
US 2021/0210961 A1 Jul. 8, 2021

(51) Int. Cl.
*H02J 7/00* (2006.01)
*H01M 10/42* (2006.01)
(Continued)

(52) U.S. Cl.
CPC ......... *H02J 7/0024* (2013.01); *H01M 10/425* (2013.01); *H01M 10/4207* (2013.01);
(Continued)

(58) Field of Classification Search
CPC ...... H02J 7/0024; H02J 7/00; H01M 10/4207; H01M 10/482; H01M 10/441;
(Continued)

(56) References Cited

U.S. PATENT DOCUMENTS 5,121,046 A 6/1992 McCullough
6,268,711 B1 7/2001 Bearfield
(Continued)

FOREIGN PATENT DOCUMENTS

CN 106463947 A 2/2017
JP 2010057288 3/2010
(Continued)

OTHER PUBLICATIONS

Kim et al., "Series-Connected Self-Reconfigurable Multicell Battery", Twenty-Sixth Annual IEEE Applied Power Electronics Conference and Exposition, Retrieved from Internet: http://digitalcommons.unl.edu/cgi/viewcontent.cgi?article=1172&context=electricalengineeringfacpub, 2011, 7 Pages.
(Continued)

*Primary Examiner* — Vuthe Siek
(74) *Attorney, Agent, or Firm* — Conley Rose P.C.

(57) ABSTRACT

A method is described in which electronic circuitry of a mobile device is powered by a plurality of battery cells that are selectably connectable in series and in parallel. The energy utilization of the circuitry is measured during operation. The power efficiency for series and parallel configurations of the battery cells is determined based on the measured energy utilization. The battery cells are configured in series or in parallel based on which of the series and parallel configurations is determined to provide a higher efficiency of energy utilization during operation.

15 Claims, 7 Drawing Sheets

(51) Int. Cl.
*H01M 10/44* (2006.01)
*H01M 10/48* (2006.01)
*H02J 7/36* (2006.01)

(52) U.S. Cl.
CPC ....... *H01M 10/441* (2013.01); *H01M 10/482* (2013.01); *H02J 7/36* (2013.01); *H01M 2010/4271* (2013.01); *H01M 2220/30* (2013.01)

(58) Field of Classification Search
CPC ....... H01M 10/425; H01M 2010/4271; H01M 2220/30; H01M 10/42; H01M 10/48; H01M 10/44
See application file for complete search history.

(56) References Cited

U.S. PATENT DOCUMENTS

| | | |
|---|---|---|
| 6,430,692 B1 | 8/2002 | Kimble et al. |
| 6,873,133 B1 | 3/2005 | Kavounas |
| 7,087,327 B2 | 8/2006 | Pearson |
| 9,493,090 B2 | 11/2016 | Timmons et al. |
| 2009/0085553 A1 | 4/2009 | Kumar et al. |
| 2009/0286149 A1 | 11/2009 | Ci et al. |
| 2012/0032641 A1* | 2/2012 | Yun ........................ H02J 7/0047 320/118 |
| 2016/0031341 A1 | 2/2016 | Komatsu |
| 2016/0046200 A1 | 2/2016 | Timmons et al. |
| 2016/0164315 A1 | 6/2016 | Hsu et al. |
| 2016/0211680 A1 | 7/2016 | Ganor |
| 2016/0254664 A1* | 9/2016 | Huang .................. H02J 7/0003 307/52 |
| 2019/0109470 A1* | 4/2019 | Ganor ............... H01M 10/4207 |

FOREIGN PATENT DOCUMENTS

| | | |
|---|---|---|
| JP | 2016-103937 A | 6/2016 |
| RU | 2551182 C2 | 5/2015 |
| WO | WO-2012176868 | 12/2012 |

OTHER PUBLICATIONS

Lin et al., "Reconfigurable Battery Techniques and Systems: A Survey", Retrieved from Internet: http://ieeexplore.ieee.org/stamp/stamp.jsp?arnumber=7442763, 2016, 15 Pages.

* cited by examiner

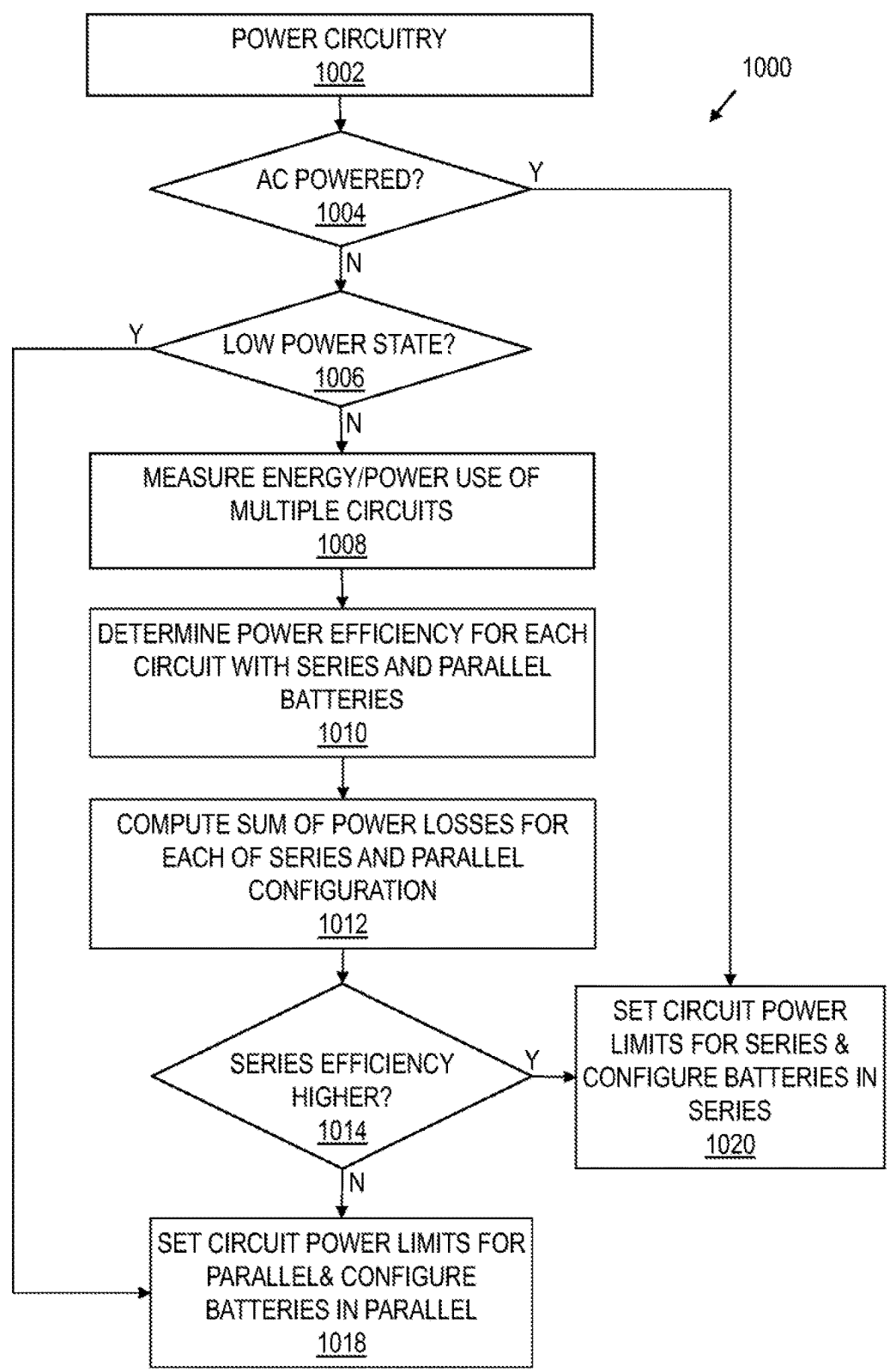

EFFICIENCY BASED BATTERY CONFIGURATIONS

BACKGROUND

A typical mobile device is powered by a number of batteries connected in series. Series connection of the batteries produces a voltage that is a multiple of a single battery. The voltage provided by the series connected batteries is generally reduced using a voltage regulator (e.g., a switch-mode voltage regulator) that powers the electronic circuits of the mobile device. The regulator output voltage may be substantially lower than that output by the batteries.

BRIEF DESCRIPTION OF THE DRAWINGS

Various examples will be described below referring to the following figures:

FIGS. 9 and 10 show flow diagrams for methods of efficiency based series/parallel battery configuration in accordance with various examples.

DETAILED DESCRIPTION

In electronic systems, a variety of factors affect overall power efficiency. Voltage regulator efficiency and conduction losses are two examples of factors that affect power efficiency, and in-turn affect the operational battery life of a battery powered system. Voltage regulator efficiency is directly related to the difference in regulator input voltage and output voltage. The greater the difference, the lower the efficiency of the regulator voltage conversion. Because the battery voltage input to a voltage regulator of a mobile device may be many times greater than the regulator output voltage, the conversion efficiency of the regulator may be sub-optimal, especially when the regulator output is lightly loaded.

Unfortunately, use of a relatively low regulator input voltage (with respect to regulator output voltage) is not without issues. For example, for low battery voltages, the large voltage drop needed to produce a charging voltage can produce undesirable heating. Additionally, at higher regulator load currents the power losses associated with a lower regulator input voltage may exceed the power losses at a higher regulator input voltage, and conduction losses may be higher with a lower input voltage.

The power management techniques disclosed herein provide improved power efficiency in a battery powered device by changing the output voltage of a battery system powering an electronic device based on the power requirements of the electronic device as measured during device operation. The battery system includes multiple batteries and switching circuitry that can configure the batteries in series to provide a higher output voltage or in parallel to provide a lower output voltage. The various subsystems of the electronic device are characterized with regard to power efficiency for parallel and series battery configuration over a range of input currents. Using measurements of current flowing in each subsystem at a given time, the power management systems disclosed herein evaluate the power efficiency of each subsystem for series and parallel battery configurations, and configure the battery system as needed to optimized overall power efficiency. By monitoring device efficiency and ensuring that the battery system is configured for the most efficient output voltage, the power management systems disclosed herein can substantially improve operating battery life of an electronic device.

Figure 1:
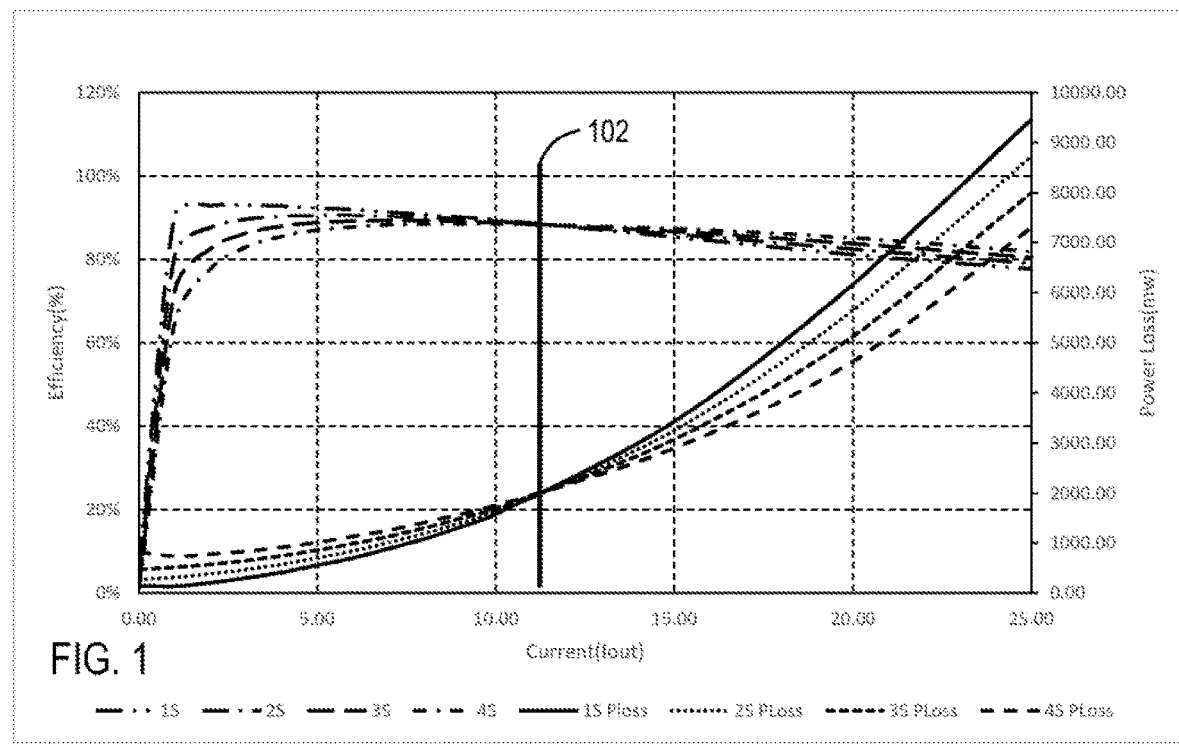
FIG. 1 shows a diagram of power efficiency and power loss for series and parallel battery configurations in accordance with various examples.

FIG. 1 shows efficiency and power loss for a switching regulator in accordance with various examples. Efficiency and loss are shown for a number of different regulator input voltages. Specifically, efficiency and loss are shown for a single battery cell (1S), and for two (2S), three (3S), and four (4S) cells in series. FIG. 1 shows that at lower regulator current outputs (i.e., lower regulator output load values) the lower input voltage provided by fewer battery cells in series results in better efficiency than that provided by a higher number of battery cells in series. Accordingly, at lower regulator current outputs the power losses are lower for lower regulator input voltages than for higher regulator input voltages. However, above a given regulator output current 102, the higher input voltage provided by more battery cells in series results in better efficiency than that provided by a lower number of battery cells in series, and power losses are lower for higher regulator input voltages than for lower regulator input voltages.

Figure 2:
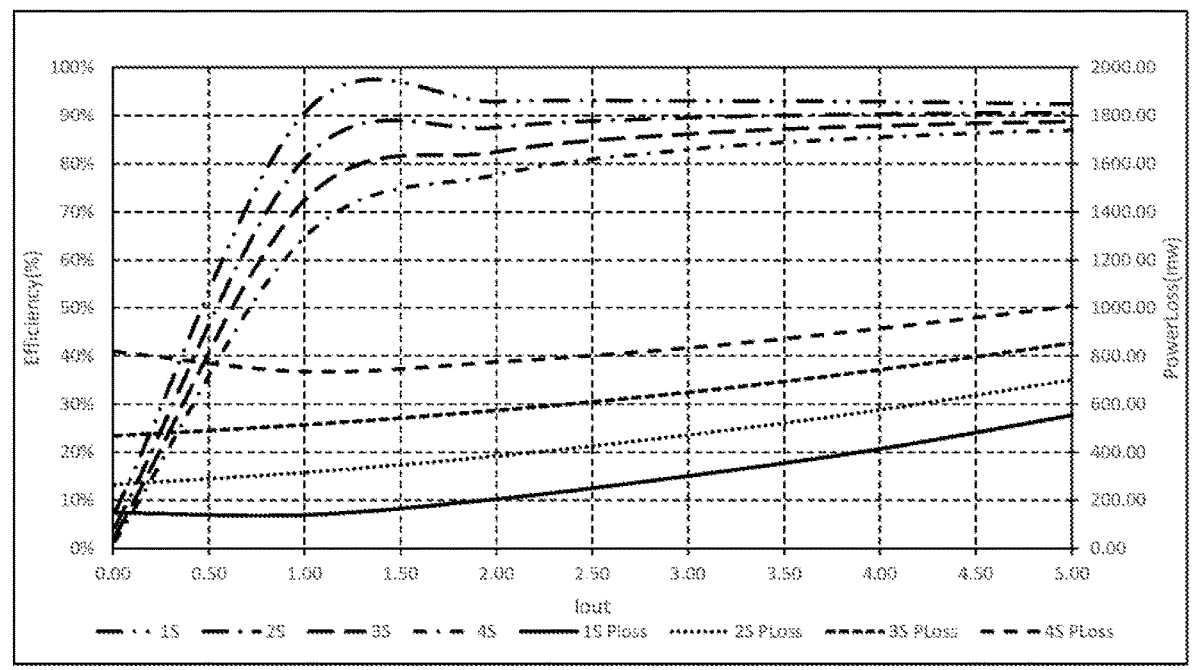
FIG. 2 shows a diagram of power efficiency and power loss for a given load with series and parallel battery configurations in accordance with various examples.

FIG. 2 shows the efficiencies and power loss of FIG. 1 for output currents ranging from 0 to five amperes. In FIG. 2, the highest efficiency and lowest loss at a regulator output current of about one ampere (e.g., the current needed to power what may be considered an average load) is provided by the output voltage corresponding to a single battery cell. Thus, FIGS. 1 and 2 show that power utilization efficiency can be improved by switching the batteries powering an electronic device from a parallel configuration for currents below the given current 102 to a series configuration for currents above the given current 102.

Figure 3:
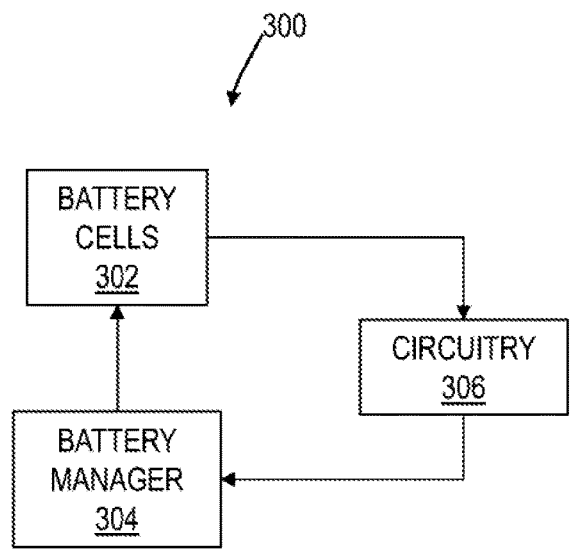
FIG. 3 shows a block diagram for a mobile device that includes efficiency based series/parallel battery configuration in accordance with various examples.

FIG. 3 shows a block diagram for a mobile device 300 that includes efficiency based series/parallel battery configuration in accordance with various examples. The mobile device 300 may be a mobile computing device such as a notebook computer, a table computer, a smartphone, an electric vehicle, or any other battery powered device. The mobile device 300 includes battery cells 302, a battery manager 304, and circuitry 306. The battery cells 302 includes a number of battery cells that can be switchably configured in series or in parallel to provide a battery output voltage that improves the power efficiency of the mobile device 300. Various implementations of the mobile device 300 may include 2, 3, 4, 5, 6, or more battery cells that can be switchably configured in series or in parallel during operation of the mobile device 300.

The battery cells 302 are coupled to the circuitry 306. The circuitry 306 may include various subsystems that are powered by the battery cells 302. For example, the circuitry 306 may include a switching regulator that receives the output of the battery cells 302 as input and provides an output voltage that powers a processor, such as a general-purpose microprocessor, a motor, or other electrical and electronic components.

The battery manager 304 is coupled to the battery cells 302 and to the circuitry 306, The battery manager 304 monitors the power utilization of the circuitry 306 and configures the battery cells 302 in parallel or in series in accordance with which configuration provides an input voltage to the circuitry 306 that results in a higher power efficiency. While the circuitry 306 is operating, the battery manager 304 measures the energy utilization of the circuitry 306. Measurement of energy utilization in the circuit 306 refers to measurement of the electricity used by the circuit 306 and such measurement can be performed by determining a value of any of a variety of electrical parameters (e.g., current, power, voltage, etc.) associated with the circuitry 306. For example, the circuitry 306 may include sub-circuits that measure the current flowing from a switching regulator that powers the circuitry 306. Given a measurement of energy (current, power, etc.) used by the circuitry 306, the battery manager 304 determines the efficiency of the circuitry 306 for the measured energy at a voltage provided by the parallel configuration of the battery cells 302 and for a voltage provided by the series configuration of the battery cells 302.

In some implementations, the battery manager 304 may determine the efficiency of the circuitry 306 with respect to series and parallel configurations of the battery cells 302 for a given energy utilization by determining the power loss associated with the circuitry 306 for battery voltages provided by the series and parallel configurations of the battery cells 302. The battery manager 304 may include tables of power loss values for series and parallel battery cell configurations at any number of measured energy values of the circuitry 306. The battery manager 304 may configure the battery cells 302 in series or parallel according which configuration provides the lowest power loss at the measured energy. In various implementations of the battery manager 304, the energy utilization of the circuitry 306 may be measured and the battery cells 302 may be reconfigured at any time (e.g., periodically or aperiodically) to improve the power use efficiency of the circuitry 306, and optimize the life of the battery cells 302.

Figure 4:
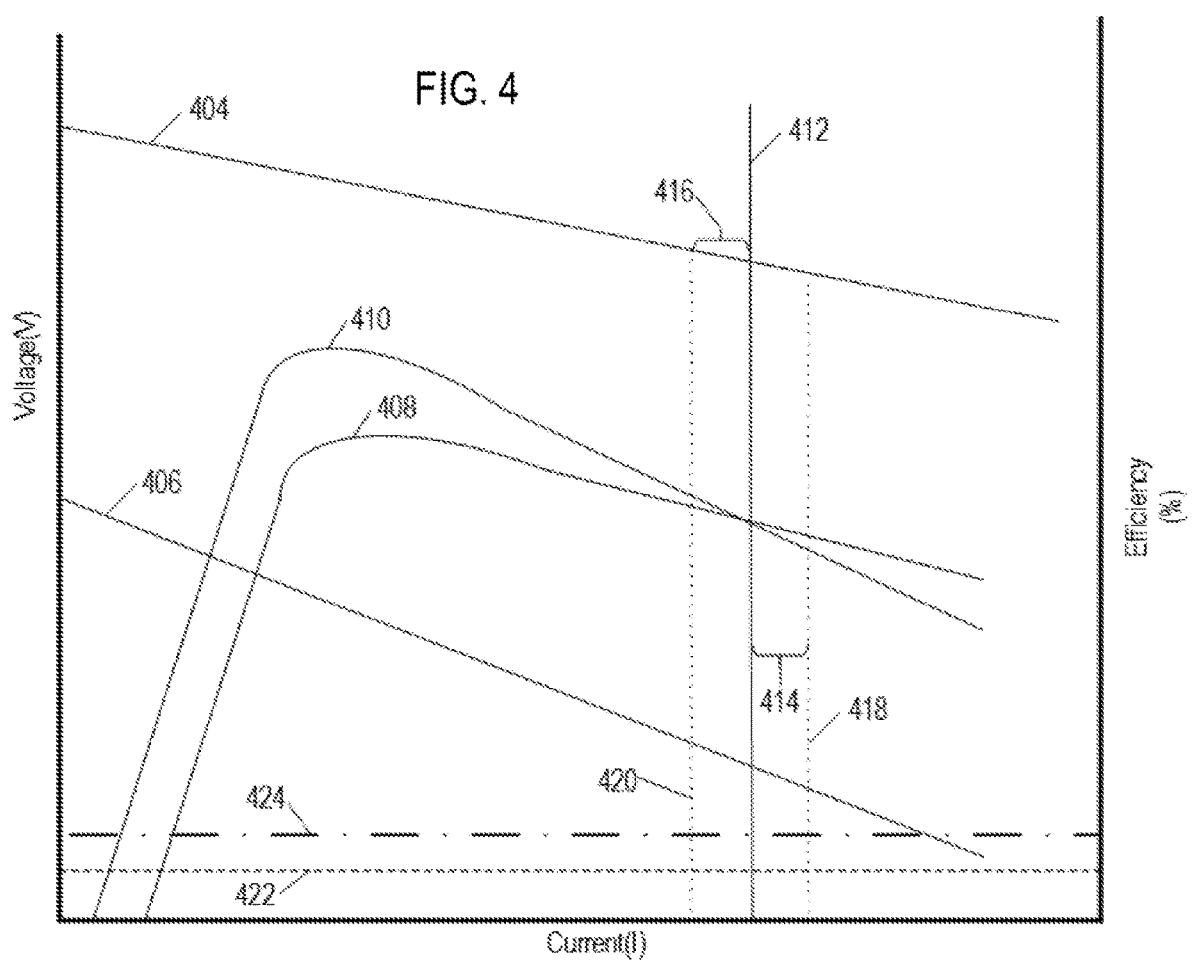
FIG. 4 shows a graph of current, voltage, and power efficiency for series and parallel configurations of battery cells in accordance with various examples.

FIG. 4 shows a graph of current, voltage, and power efficiency for series and parallel configurations of the battery cells 302 in accordance with various examples. The graph of FIG. 4 shows voltage versus current 404 for a series configuration of the battery cells 302, voltage versus current 406 for a parallel configuration of the battery cells 302, efficiency 408 for the series configuration of the battery cells 302, and efficiency 410 for the parallel configuration of the battery cells 302.

The series and parallel efficiency curves 408 and 410 cross at a value of current 412. At currents higher than current 412 the series configuration of the battery cells 302 provides higher efficiency, and at currents lower than the current 412 the parallel configuration of the battery cells 302 provides higher efficiency. FIG. 4 also shows a guard band 414 for switching from parallel to series battery configurations as current increases, and a guard band 416 for switching from series to parallel battery configurations as current decreases. For example, as current draw increases, the battery monitor 304 may switch the battery cells 302 from parallel to series configuration at current 418. Similarly, as current draw decreases, the battery monitor 304 may switch the battery cells 302 from series to parallel configuration at current 420.

FIG. 4 also shows a minimum voltage 422 at which the circuitry 306 will operate properly and a voltage 424 at which the battery cells 302 may be operated in a parallel configuration to provide the minimum voltage 422. The battery manager 304 may measure the output voltage of the parallel battery cells and reconfigure the battery cells 302 from parallel to series should the output voltage of the battery cells 302 fall below the voltage 424.

Figure 5:
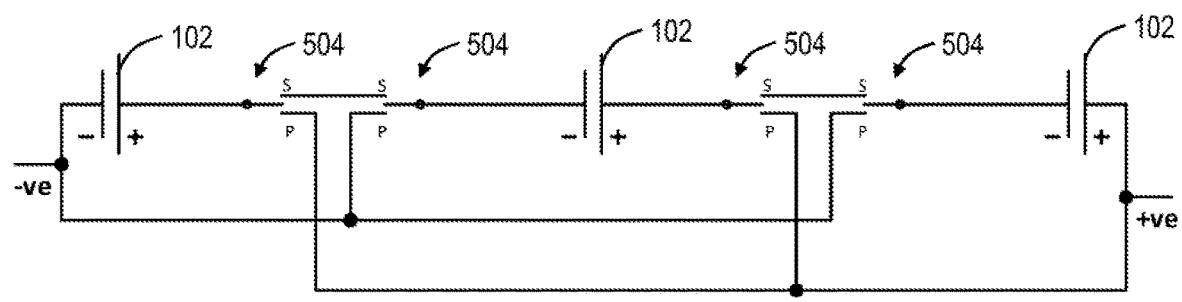
FIG. 5 shows a schematic diagram of battery cells that are switchably coupled for series and parallel configuration in accordance with various examples.

FIG. 5 shows an example of the battery cells 302. The battery cells 302 include a number of batteries 502. The batteries 502 are connected by a plurality of switches 504. While three batteries 502 are shown as interconnected by four switches in FIG. 5, in practice the battery cells 302 may include two or more batteries 502 (e.g., 2, 3, 4, 5, 6, or more batteries) and a number of switches 504 suitable for connecting the batteries 502 in series and/or in parallel (e.g., 1, 2, 3, 4, 5, or more switches). In various implementations, the switches 504 may be semiconductor switches or electromechanical switches.

Figure 6:
FIG. 6 shows a mobile device that includes efficiency based series/parallel battery configuration in accordance with various examples.

FIG. 6 shows a mobile device 600 that includes efficiency based series/parallel battery configuration in accordance with various examples. The mobile device 600 is an implementation of the mobile device 300. The mobile device 600 includes battery cells 602, a battery manager 604, and circuitry 606. The battery cells 602 may be an implementation of the battery cells 302, and include a number of battery cells that can be switchably configured in series or in parallel to provide a battery output voltage that results in highest power efficiency of the mobile device 600. Various implementations of the battery cells 602 may include 2, 3, 4, 5, 6, or more batteries that can be switchably configured in series or in parallel during operation of the mobile device 600.

The battery cells 602 are coupled to the circuitry 306. The circuitry 606 includes various circuits that are powered by the battery cells 302. For example, the circuitry 606 includes circuit 1 608, circuit 2 610, and circuit 3 612. Various implementations of the circuitry 606 may include more or fewer circuits than the circuitry 606. Each of the circuits 608, 610, and 612 may include a switching regulator that receives the output of the battery cells 302 as input and provides an output voltage that powers the circuit. For example, circuit 1 608 may include a general purpose processor and a switching regulator that powers the general purpose processor, circuit 2 610 may include a graphics processor and a switching regulator that powers the graphics processor, circuit 3 612 may include a display backlight and a switching regulator that powers the display backlight. Other circuits of the circuitry 606 may include, for example, a universal serial bus hub and associated voltage regulator, an audio system and associated regulator, an electric motor and associated controller, or other electronic subsystems.

Each of the circuits 608-612 is coupled to the battery manager 604. For example, each of the circuits 608-612 may include an energy measurement sub-circuit that measures the energy used by the associated circuit and communicates energy measurement values to the battery manager 604. For each of the circuits 608-612, the battery manager 604 determines, for a received energy utilization value, or an average of energy utilization values received over time, a value of efficiency for the battery cells 602 in series and a value of efficiency for the battery cells 602 in parallel. The battery manager 604 may combine the efficiencies for the circuits 608-612 for battery cells 602 in parallel configuration, and combine the efficiencies for the circuits 608-612 for battery cells 602 in series configuration to produce an overall series efficiency and an overall parallel efficiency. Comparison of the overall efficiencies (e.g., a higher overall efficiency) indicates whether the series or parallel configuration of the battery cells 302 should be applied to optimize power efficiency of the circuitry 606. The battery manager 604 may configure the battery cells 602 in series or parallel in accordance with the overall efficiencies of the circuits 608-612. For example, referring to FIG. 4, if the series battery efficiency exceeds the parallel battery efficiency by a predetermined amount (e.g., a guardband amount), then the battery manager 604 may configure the battery cells 602 in series. Similarly, if the parallel battery efficiency exceeds the series battery efficiency by a predetermined amount (e.g., a guardband amount), then the battery manager 604 may configure the battery cells 602 in parallel.

Figure 7:
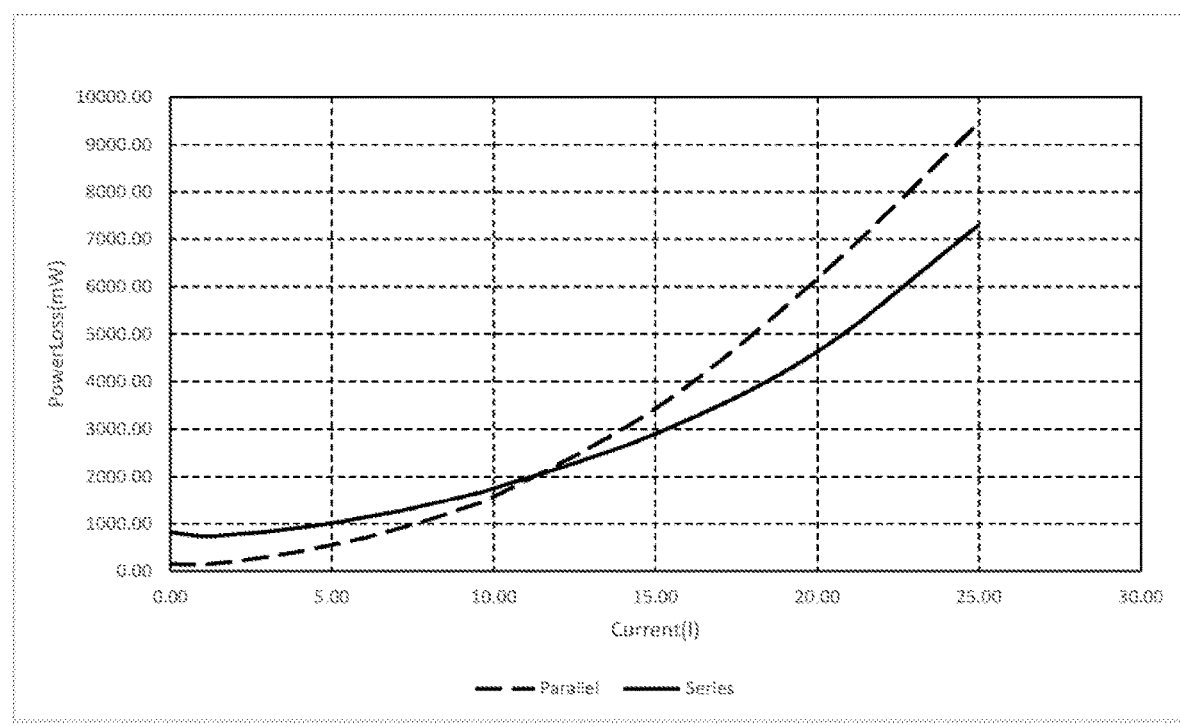
FIG. 7 shows an a diagram of power loss in a circuit for series and parallel configurations of battery cells in accordance with various examples.

In some implementations, the battery manager 604 may determine the efficiency of each circuit 608-612 with respect to series and parallel configurations of the battery cells 602 for a given energy utilization by determining the power loss associated with each circuit 608-612 for battery voltages provided by the series and parallel configurations of the battery cells 602. FIG. 7 shows an example of power loss data for the circuit 1 608. The power loss data includes power loss versus current for both series and parallel battery configurations. The battery manager 604 may include tables of the power loss values for series and parallel battery cell configurations for each circuit 608-612 at any number of measured energy values. The battery manager 304 may configure the battery cells 602 in series or parallel according to which configuration provides the lowest sum of power loss at the measured energy. For example, if the series battery power loss (e.g., the sum of series power losses for the circuits 608-612) is less than the parallel battery power loss (e.g., the sum of parallel power losses for the circuits 608-612) by a predetermined amount (e.g., a guardband amount), then the battery manager 604 may configure the battery cells 602 in series. Similarly, if the parallel battery power loss is less than the series battery power loss by a predetermined amount (e.g., a guardband amount), then the battery manager 604 may configure the battery cells 602 in parallel.

One or more of the circuits 608-612 may also include subsystems that allow the circuit to limit the power used by the circuit. For example, if circuit 1 608 includes a general purpose processor, then the processor may be programmed to limit the energy used by limiting the clock frequency of the processor. After the battery manager 604 has determined that the configuration of the battery cells 602 is to be changed, and prior to changing the configuration of the battery cells 602, the battery manager 604 may set the power limitations of the circuit to restrict power utilization of the circuit to a range that does not exceed the power that can be provided by the reconfigured battery cells 602. Accordingly, if the configuration of the battery cells 602 is to be changed from parallel to series, then the battery manager 604 may increase the power limits of the circuit, and if the configuration of the battery cells 602 is to be changed from series to parallel, then the battery manager 604 may decrease the power limits of the circuit. The battery manager 604 may include series and parallel power limits for each circuit 608-612 and set the limitations for each circuit prior to changing the configuration of the battery cells 602.

In addition to setting the configuration of the battery cells 602 based on power efficiency, the battery manager 604 may set the configuration of the battery cells 602 based on other parameters of the mobile device 602. For example, the battery manager 604 may receive an indication that an external power source, such as an AC adapter (e.g., an AC-DC converter), is coupled to the mobile device 600. Responsive to the indication of an attached external power source, the battery manager 604 may configure the battery cells 302 in series. Similarly, the battery manager 604 may receive an indication that the mobile device 600 is in a power conservation or low power state (e.g., a sleep state, a hibernate state, standby state, etc.). Responsive to the indication of the mobile device 600 being in a low power state, the battery manager 604 may configure the battery cells 302 in parallel.

In one example, the mobile device 600 is an electric vehicle and in low loading conditions like city driving, the battery manager 604 determines that a parallel battery configuration provides optimal efficiency and connects the battery cells 602 in parallel to provide higher power efficiency and improved mileage. Similarly, during intervals of high acceleration or high speed driving the battery manager 604 determines that a series battery configuration provides optimal efficiency and connects the battery cells 602 in series. When vehicle battery reaches critically low level, the battery manager 604 can extend vehicle range by configuring the battery cells 602 in parallel to provide optimal power efficiency.

Figure 8:
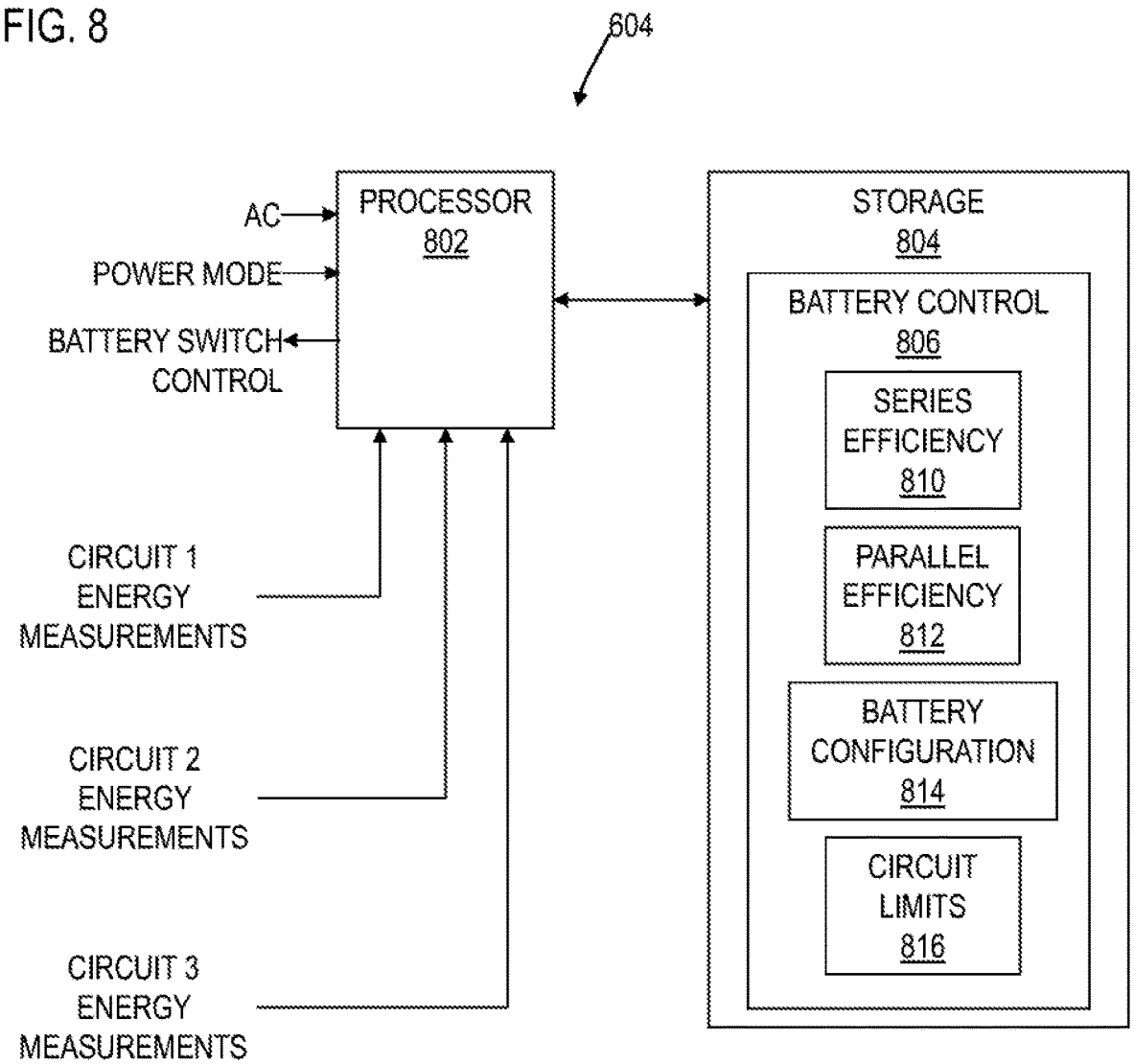
FIG. 8 shows a block diagram for a battery manager that controls series and parallel configuration of battery cells in accordance with various examples.

FIG. 8 shows a block diagram of the battery manager 604 in accordance with various examples. The battery manager 604 includes a processor 802 and storage 804. The processor 802 may include a general-purpose microprocessor, a digital signal processor, a microcontroller, a graphics processor, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and sub-systems.

The processor 802 is coupled to the storage 804. The storage 804 is a computer-readable medium that stores instructions and data for access and use by the processor 802. The storage 804 may include any of volatile storage such as random access memory, non-volatile storage (e.g., a hard drive, an optical storage device (e.g., CD or DVD), FLASH storage, read-only-memory), or combinations thereof. The storage 804 includes battery control 806 that provides instructions for switchably configuring the battery cells 602 in series or parallel for optimizing power efficiency as disclosed herein. The battery control 806 includes series efficiency 810, parallel efficiency 812, battery configuration 814, and circuit limits 816.

The series efficiency 810 includes instructions that are executable by the processor 802 to determine the power efficiency of a circuit with the battery cells 602 connected in series. For example, given circuit 1 energy measurements, circuit 2 energy measurements, and circuit 3 energy measurements received from the circuitry 606, the processor 802 may execute instructions of the series efficiency 810 to determine the efficiency of each of circuit 1 608, circuit 2 610, and circuit 3 612 with the battery cells 602 connected in series. A value of efficiency corresponding to a measured energy value may be retrieved from a table of the series efficiency 810 that stores efficiency values corresponding to series battery cells as a function of measured energy. Interpolation may be applied to generate some efficiency values based on the values stored in the table. The series efficiency 810 may combine the efficiencies for all circuits to produce a combined series efficiency value.

In some implementations, the instructions of the series efficiency 810 may determine power loss of each circuit with the battery cells 602 connected in series. For example, given circuit 1 energy measurements, circuit 2 energy measurements, and circuit 3 energy measurements received from the circuitry 606, the processor 802 may execute instructions of the series efficiency 810 to determine the power loss of each of circuit 1 608, circuit 2 610, and circuit 3 612 with the battery cells 602 connected in series. A value of power loss corresponding to a measured energy value may be retrieved from a table of the series efficiency 810 that stores power loss values corresponding to series battery cells as a function of measured energy. Interpolation may be applied to generate some power loss values based on the values stored in the table. The series efficiency 810 may sum the power loss for all circuits to produce a combined series power loss value.

The parallel efficiency 812 includes instructions that are executable by the processor 802 to determine the power efficiency of a circuit with the battery cells 602 connected in parallel. For example, given circuit 1 energy measurements, circuit 2 energy measurements, and circuit 3 energy measurements received from the circuitry 606, the processor 802 may execute instructions of the parallel efficiency 812 to determine the efficiency of each of circuit 1 608, circuit 2 610, and circuit 3 612 with the battery cells 602 connected in parallel. A value of efficiency corresponding to a measured energy value may be retrieved from a table of the parallel efficiency 812 that stores efficiency values corresponding to parallel battery cells as a function of measured energy. Interpolation may be applied to generate some efficiency values based on the values stored in the table. The parallel efficiency 812 may combine the efficiencies for all circuits to produce a combined parallel efficiency value.

In some implementations, the instructions of the parallel efficiency 812 may determine power loss of each with the battery cells 602 connected in parallel. For example, given circuit 1 energy measurements, circuit 2 energy measurements, and circuit 3 energy measurements received from the circuitry 606, the processor 802 may execute instructions of the parallel efficiency 812 to determine the power loss of each of circuit 1 608, circuit 2 610, and circuit 3 612 with the battery cells 602 connected in parallel. A value of power loss corresponding to a measured energy value may be retrieved from a table of the parallel efficiency 812 that stores power loss values corresponding to parallel battery cells as a function of measured energy. Interpolation may be applied to generate some power loss values based on the values stored in the table. The parallel efficiency 812 may sum the power loss for all circuits to produce a combined parallel power loss value.

The battery configuration 814 includes instructions that are executable by the processor 504 to connect the battery cells 602 in series or in parallel. Given series and parallel efficiency values generated by the series efficiency 810 and the parallel efficiency 812, the battery configuration 814 determines whether series or parallel connection of the battery cells 602 provides highest power efficiency of the circuitry 606 and generates battery switch control signals to cause the switches 504 to connect the batteries 502 in series or parallel. For example, if the efficiency values generated by the series efficiency 810 and the parallel efficiency 812 indicate that series connection of the battery cells 602 will provide higher energy efficiency than parallel connection of the battery cells 602, then the battery configuration 814 can cause the processor 802 to generate battery switch control signals that actuate the switches 504 to connect the batteries 502 in series. Similarly, if the efficiency values generated by the series efficiency 810 and the parallel efficiency 812 indicate that parallel connection of the battery cells 602 will provide higher energy efficiency than series connection of the battery cells 602, then the battery configuration 814 can cause the processor 802 to generate battery switch control signals that actuate the switches 504 to connect the batteries 502 in parallel.

The battery configuration 814 may also include instructions that set the configuration of the battery cells 602 based on operational states of the mobile device 600. For example, if the processor 802 receives an indication that an external power source, such as an AC adapter, is coupled to the mobile device 600, then responsive to the indication of the attached AC adapter, the instructions of the battery configuration 812 may cause the processor 802 to connect the battery cells 602 in series. Similarly, if the processor 802 receives an indication that the mobile device 600 is in a low power state (e.g., a sleep state, a hibernate state, a standby state, etc.), then responsive to the indication of the mobile device 600 being in a low power state, the instructions of the battery configuration 812 may cause the processor 802 to connect the battery cells 602 in parallel.

The circuit limits 816 includes instructions that are executable by the processor 504 to restrict power use of given circuits as appropriate for the power expected to be provided by series or parallel connected battery cells 602. For example, referring to FIG. 4, the power available from parallel connected battery cells 602 is lower than the power available from series connected battery cells 602. Accordingly, prior to connecting the battery cells 602 in parallel, the instructions of the circuit limits 816 may cause the processor 802 to set power limit values in one or more of the circuits 608-612 to a value that limits the power use of the circuit to power available from the parallel connected battery cells 602. Similarly, prior to connecting the battery cells 602 in series, the instructions of the circuit limits 816 may cause the processor 802 to set power limit values in one or more of the circuits 608-612 to a value that limits the power use of the circuit to power available from the series connected battery cells 602. Series and parallel battery configuration limit value for each of the circuits 608-612 may be stored in the circuit limits 816.

Figure 9:
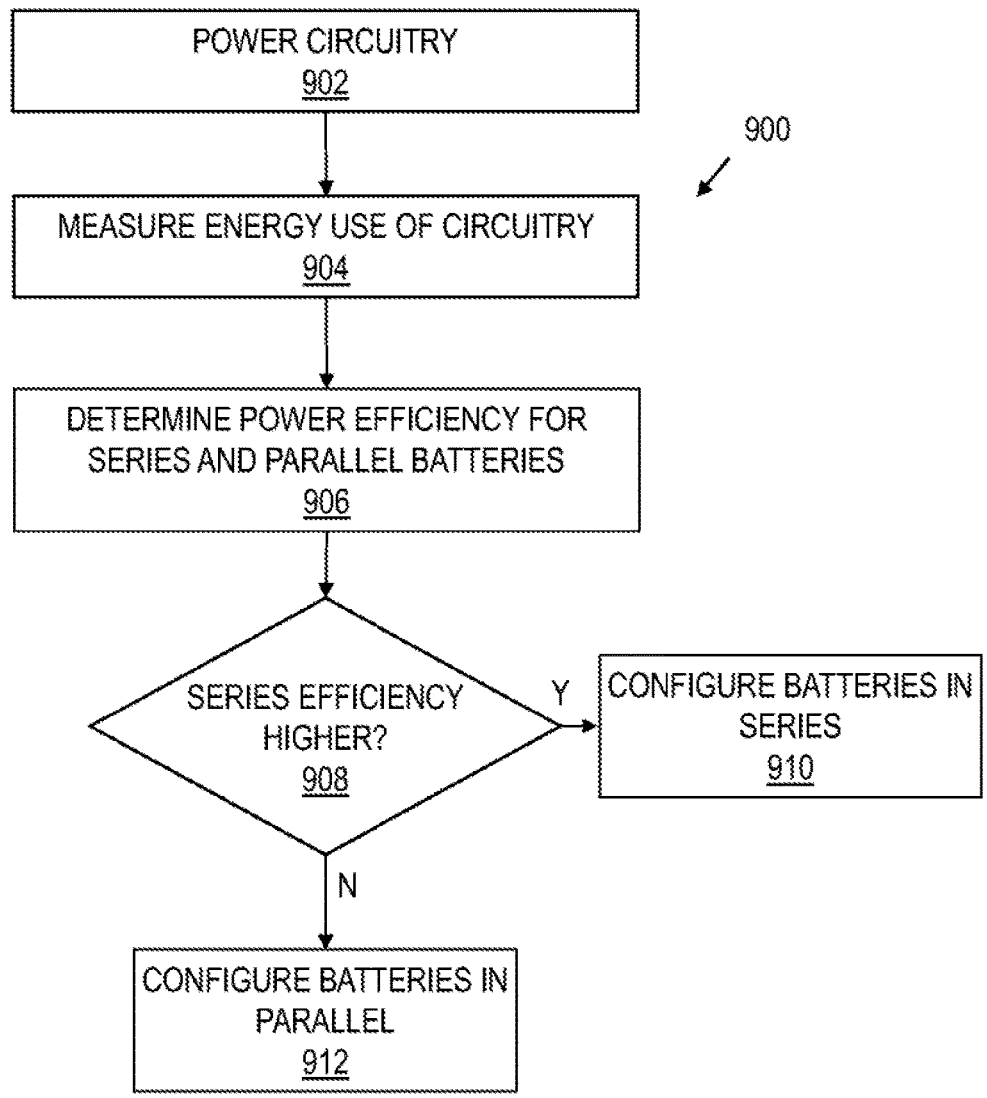

FIG. 9 shows a flow diagram for a method 900 of efficiency based series/parallel battery configuration in accordance with various examples. Though depicted sequentially as a matter of convenience, at least some of the actions shown can be performed in a different order and/or performed in parallel. Additionally, some implementations may perform only some of the actions shown. In some implementations, at least same of the operations of the method 900 can be implemented as instructions stored in a storage device and executed by one or mare processors.

In block 902, the circuitry 306 is powered and operating. For example, the battery cells 302 may be connected in series or in parallel to power a switching regulator of the circuitry 306, and output the switching regulator may power various sub-circuits of the circuitry 306.

In block 904, the energy used by the circuitry 306 is measured. The circuitry 306 may include an energy measurement sub-circuit that measures the energy used by the circuitry 306. For example, the current flowing into or out of a switching regulator that powers the circuitry 306 may be measured.

In block 906, the power efficiency of the circuitry 306 is determined for series and parallel configurations of the battery cells 302 based on the energy use of the circuitry 306 measured in block 904. For example, a value of measured energy use may be used as an index to access a table of energy efficiency for a series battery configuration, and retrieve from the table a value of energy efficiency for series connected battery cells (i.e., a series efficiency value) corresponding to the measured energy use. Similarly, the value of measured energy use may be used as an index to access a table of energy efficiency for a parallel battery configuration, and retrieve from the table a value of energy efficiency for parallel connected battery cells (i.e., a parallel efficiency value) corresponding to the measured energy use.

In block 908, if comparison of the series efficiency value and the parallel efficiency value indicates that the energy efficiency of the circuitry 306 at the value of measured energy use is greater with series connected battery cells than with parallel connected battery cells, then, in block 910, the battery manager 304 configures the battery cells 302 in series. On the other hand, if, in block 908, comparison of the series efficiency value and the parallel efficiency value indicates that the energy efficiency of the circuitry 306 at the value of measured energy use is greater with parallel connected battery cells than with series connected battery cells, then in in block 912, the battery manager 304 configures the battery cells 302 in parallel.

FIG. 10 shows a flow diagram for a method 1000 of efficiency based series/parallel battery configuration in accordance with various examples. Though depicted sequentially as a matter of convenience, at least some of the actions shown can be performed in a different order and/or performed in parallel. Additionally, some implementations may perform only some of the actions shown. In some implementations, at least some of the operations of the method 1000 can be implemented as instructions stored in a storage device and executed by one or more processors.

In block 1002, the circuitry 606 is powered and operating. For example, the battery cells 602 may be connected in series or in parallel to power switching regulators of the circuits 608-612, and output the switching regulators may power various sub-circuits of the circuits 608-612.

In block 1004, the battery manager 604 determines whether an external power source, such as an AC adapter, is connected to the mobile device 600. If the mobile device 600 is being powered by an external power source, then the method continues in block 1020. In block 1020, if one or more of the circuits 608-612 supports programmable power limits, then the battery manager 604 set the power limits of the circuit(s) as appropriate for the battery cells 602 in series. For example, the battery manager 604 may set parameters of a circuit to allow the circuit to generate and operate a higher clock frequency. After setting the power limits of the circuits 608-612, the battery manager 604 configures the battery cells 602 in series. For example, the battery manager 604 may cause switches 504 to connect the batteries 502 in series. If, in block 1004, the battery manager 604 determines that an external power source is powering the mobile device 600, and the battery cells 602 are already connected in series, then the operations of block 1020 may not be performed.

If, in block 1004, the battery manager 604 determines that an external power source is not powering the mobile device 600, then the method continues in block 1006. In block 1006, the battery manager 604 determines whether the mobile device 600 is in a low-power state. If the mobile device is in a low-power state, then the method continues in block 1018. In block 1018, if one or more of the circuits 608-612 supports programmable power limits, then the battery manager 604 sets the power limits of the circuit(s) as appropriate for the battery cells 602 in parallel. For example, the battery manager 604 may set parameters of a circuit to allow the circuit to generate and operate at no more than a given clock frequency. After setting the power limits of the circuits 608-612, the battery manager 604 configures the battery cells 602 in parallel. For example, the battery manager 604 may cause switches 504 to connect the batteries 502 in parallel. If, in block 1006, the battery manager 604 determines that the mobile device 600 is in a low-power state, and the battery cells 602 are already connected in parallel, then the operations of block 1018 may not be performed.

If, in block 1006, the battery manager 604 determines that the mobile device 600 is not in a low-power state, then the method continues in block 1008. In block 1008, the energy used by each of the circuits 608-612 is measured. Each of the circuits 608-612 may include an energy measurement sub-circuit that measures the energy used by the circuit. For example, each of the circuits 608-612 may include a measurement sub-circuit that measures the current flowing into or out of a switching regulator that powers the circuit. In implementations of the circuits 608-612 that lack a measurement sub-circuit, the battery manager 604 may estimate the power use of the circuit based on performance information provided by the circuit.

In block 1010, the power efficiency of the circuitry 606 is determined for series and parallel configurations of the battery cells 302 based on the energy use of the circuitry 606 measured in block 1008. For example, for each of the circuits 608-612, a value of measured energy use may be used as an index to access a table of energy efficiency for a series battery configuration, and retrieve from the table a value of energy efficiency for series connected battery cells (i.e., a series efficiency value) corresponding to the measured energy use. Similarly, for each of the circuits 608-612, the value of measured energy use may be used as an index to access a table of energy efficiency for a parallel battery configuration, and retrieve from the table a value of energy efficiency for parallel connected battery cells (i.e., a parallel efficiency value) corresponding to the measured energy use. In some implementations, the energy efficiency of each circuit may be expressed as power loss for parallel and series battery configurations.

In block 1012, the cumulative series efficiency value for the circuitry 606 may be determined by summing the series power loss of each circuit 608-612. Similarly, the cumulative parallel efficiency value for the circuitry 606 may be determined by summing the parallel power loss of each circuit 608-612.

In block 1014, if comparison of the cumulative series efficiency value and the cumulative parallel efficiency value indicates that the energy efficiency of the circuitry 606 at the value of measured energy use is greater with series connected battery cells than with parallel connected battery cells, then the method continues in block 1020 as previously described. On the other hand, if, in block 1014, comparison of the cumulative series efficiency value and the cumulative parallel efficiency value indicates that the energy efficiency of the circuitry 606 at the value of measured energy use is greater with parallel connected battery cells than with parallel connected battery cells, then the method continues in block 1018 as previously described.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A mobile device, comprising:
   a plurality of battery cells that are selectably connectable in series and in parallel;
   a set of switches to selectively couple a first battery cell in the plurality of battery cells and a second battery cell in the plurality of battery cells, each switch of the set of switches being selectively controllable to be in a first position to couple the first battery cell and the second battery cell in series and a second position to couple the first battery cell and the second battery cell in parallel; and
   a battery manager coupled to the battery cells and to circuitry of the mobile device, the battery manager to:
      measure energy utilization of the circuitry during operation;
      determine power efficiency for series and parallel configurations of the battery cells based on the measured energy utilization;
      configure the battery cells in series responsive to determining that the series configuration provides a higher efficiency of energy utilization during operation than does the parallel configuration; and
      configure the battery cells in parallel responsive to determining that the parallel configuration provides a higher efficiency of energy utilization during operation than does the series configuration.

2. The mobile device of claim 1 wherein the battery manager is to:
   determine power loss for the circuitry for both series and parallel configurations of the battery cells based on the measured energy utilization; and
   configure the battery cells in series or in parallel based on which of the series or parallel configurations provides a lower power loss during operation.

3. The mobile device of claim 1, wherein the circuitry comprises a plurality of circuits and the battery manager is to:
   measure energy utilization of each circuit during operation;
   for each circuit, determine power efficiency for series and parallel configurations of the battery cells based on the measured energy utilization;
   generate a combination of the power efficiencies for the circuits for the battery cells in the series configuration, and a combination of the power efficiencies for the circuits for the battery cells in the parallel configuration;
   determine whether the series or parallel configuration of the battery cells provides higher efficiency based on the combinations of the power efficiencies.

4. The mobile device of claim 1, wherein the battery manager is to:
   set the circuitry to apply first power utilization limits responsive to a determination that the series configuration of the battery cells provides higher power efficiency than the parallel configuration of the battery cells; and
   set the circuitry to apply second power utilization limits responsive to a determination that the parallel configuration of the battery cells provides higher power efficiency than the series configuration of the battery cells.

5. The mobile device of claim 4, wherein the battery manager is to set the circuitry to apply the power utilization limits prior to changing between series and parallel configurations of the battery cells.

6. The mobile device of claim 1, wherein the battery manager is to configure the battery cells in series responsive to detection of an external power source being connected to the mobile device.

7. The mobile device of claim 1, wherein the battery manager is to configure the battery cells in parallel responsive to the mobile device entering a power conservation state.

8. A method, comprising:
   powering electronic circuitry of a mobile device with a plurality of battery cells that are selectably connectable together in series and in parallel, a set of switches coupled to the plurality of battery cells, the set of switches to selectively couple a first battery cell in the plurality of battery cells terminal, or and a second battery cell in the plurality of battery cells, each switch of the set of switches being selectively controllable to be in a first position to couple the first battery cell and the second battery cell in series and a second position to couple the first battery cell and the second battery cell in parallel;
   measuring energy utilization of the circuitry during operation;
   determining power efficiency for series and parallel configurations of the battery cells based on the measured energy utilization;
   configuring the battery cells in series responsive to determining that the series configuration provides a higher efficiency of energy utilization during operation than does the parallel configuration; and
   configuring the battery cells in parallel responsive to determining that the parallel configuration provides a higher efficiency of energy utilization during operation than does the series configuration.

9. The method of claim 8, wherein determining the power efficiency further comprises determining the power loss for the circuitry for both series and parallel configurations of the battery cells based on the measured energy utilization; and the configuring comprises configuring the battery cells in series or in parallel based on which of the series or parallel configurations provides a lower power loss during operation.

10. The method of claim 8, wherein:
    the measuring further comprises individually measuring the energy utilization of each of a plurality of circuits during operation;
    the determining further comprises:
       determining, for each of the circuits, power efficiency for series and parallel configurations of the battery cells based on the measured energy utilization;
       generating a combined power efficiency based on the power efficiencies for the circuits for the battery cells in the series configuration, and a combined power efficiency based on the power efficiencies for the circuits for the battery cells in the parallel configuration; and
       determining whether the series or parallel configuration of the battery provides higher efficiency based on the combined power efficiencies.

11. The method of claim 8, further comprising:
prior to configuring the battery cells in series or in parallel:
setting the circuitry to apply first power utilization limits responsive to a determination that the series configuration of the battery cells provides higher power efficiency than the parallel configuration of the battery cells; and
setting the circuitry to apply second power utilization limits responsive to a determination that the parallel configuration of the battery cells provides higher power efficiency than the series configuration of the battery cells;
wherein the first power utilization limits are different from the second power utilization limits.

12. The method of claim 8, further comprising configuring the battery cells in series responsive to detection of an external power source being connected to the mobile device.

13. The method of claim 8, further comprising configuring the battery cells in parallel responsive to the mobile device entering a power conservation state.

14. A non-transitory computer-readable medium encoded with instructions executable by a processor to:
individually measure energy utilization of a plurality of circuits of a device during operation;
determine, for each of the circuits, power efficiency for a series configuration and a parallel configuration of a plurality of battery cells based on the measured energy utilization;
generate a combination of the power efficiencies for the circuits for the battery cells in the series configuration, and a combination of the power efficiencies for the circuits for the battery cells in the parallel configuration;
determine whether the series or parallel configuration of the battery cells provides higher efficiency based on the combinations of the power efficiencies; and
configure the battery cells in series or in parallel to provide the higher efficiency, the battery cells configured in series or in parallel by a set of switches coupled to the battery cells, each switch of the set of switches being selectively controllable to be in a first position to couple the first battery cell and the second battery cell in series and a second position to couple the first battery cell and the second battery cell in parallel, the set of switches to:
selectively couple a first battery cell in the battery cells in series with a second battery cell in the battery cells responsive to determining the series configuration provides higher efficiency; and
selectively couple the first battery cell in the battery cells in parallel with the second battery cell in the battery cells responsive to determining the parallel configuration provides higher efficiency.

15. The computer-readable medium of claim 14, wherein the instructions are executable by the processor to, prior to changing between series and parallel configurations of the battery cells, set at least one of the circuits to apply first power utilization limits responsive to a determination that the series configuration of the battery cells provides higher power efficiency than the parallel configuration of the battery cells; and set at least one of the circuits to apply second power utilization limits responsive to a determination that the parallel configuration of the battery cells provides higher power efficiency than the series configuration of the battery cells.

* * * * *